United States Patent [19]

Kanda et al.

[11] Patent Number: 5,833,520
[45] Date of Patent: Nov. 10, 1998

[54] MIRROR POLISHING DEVICE

[75] Inventors: Torahiko Kanda; Masashige Mitsuhashi; Shigenobu Wada, all of Tokyo, Japan

[73] Assignee: NEC Corporation, Tokyo, Japan

[21] Appl. No.: 686,413

[22] Filed: Aug. 27, 1996

Related U.S. Application Data

[63] Continuation of Ser. No. 223,237, Apr. 5, 1994, abandoned.

[30] Foreign Application Priority Data

| Apr. 7, 1993 | [JP] | Japan | 5-079951 |
| Dec. 14, 1993 | [JP] | Japan | 5-313322 |

[51] Int. Cl.⁶ .................. B24B 7/24; B24B 9/02
[52] U.S. Cl. ............. 451/72; 451/41; 451/178; 451/246; 125/11.04; 125/11.18; 125/11.22; 125/11.23
[58] Field of Search .............. 451/21, 22, 41, 451/56, 72, 178, 246, 259, 285, 398, 909; 125/11.04, 11.18, 11.19, 11.22, 11.23

[56] References Cited

U.S. PATENT DOCUMENTS

| 2,352,146 | 6/1944 | Desenberg . | |
| 2,827,037 | 3/1958 | Wallace et al. | 125/11.04 |
| 3,526,058 | 9/1970 | Price | 451/72 |
| 4,180,946 | 1/1980 | Heijkenskjold et al. | 451/24 |
| 4,587,768 | 5/1986 | Doyle . | |
| 4,683,679 | 8/1987 | Salmon | 451/72 |
| 4,839,993 | 6/1989 | Masuko et al. . | |
| 4,905,415 | 3/1990 | Moulin . | |
| 4,914,867 | 4/1990 | Saito et al. | 451/24 |
| 4,953,522 | 9/1990 | Vetter | 451/56 X |
| 5,071,525 | 12/1991 | Ushiyama | 204/129.46 |
| 5,184,433 | 2/1993 | Maack . | |
| 5,209,020 | 5/1993 | Feisel | 451/56 X |
| 5,291,691 | 3/1994 | Unno et al. | 451/21 |
| 5,472,371 | 12/1995 | Yamakura et al. | 451/56 |
| 5,480,344 | 1/1996 | Xu et al. | 451/56 X |
| 5,547,414 | 8/1996 | Ohmori | 451/56 X |

FOREIGN PATENT DOCUMENTS

| 4023975 A1 | 1/1991 | Germany . |
| 2102595 | 8/1994 | Germany . |

*Primary Examiner*—Timothy V. Eley

[57] ABSTRACT

A device for mirror-polishing the end of an optical fiber connector or similar elongate workpiece into a convex shape. A first grindstone polishes the workpiece while a second grindstone corrects the work surface of the first grindstone when it is deformed. The work surfaces of the first and second grindstones run in perpendicular directions or in inclined directions, so that an arcuate concavity having a circular or oval cross-section is formed in the work surface of the first grindstone. Electrolytic dressing is applied to the work surface of the first grindstone to provide it with high processing ability at all times. When the concavity of the first grindstone is deformed, the second grindstone corrects it with the work surface thereof.

5 Claims, 7 Drawing Sheets

MIRROR POLISHING DEVICE

This application is a continuation of application Ser. No. 08/223,237, filed Apr. 5, 1994 now abandoned.

BACKGROUND OF THE INVENTION

The present invention relates to a device for mirror-polishing the end of an optical fiber connector or similar workpiece made of, for example, glass, ceramics and plastics and having a circular or rectangular cross-section into a convex shape.

Typical of workpieces which need mirror-polishing is an optical fiber. When two optical fibers are connected together to transmit optical signals therethrough, it is necessary to mirror-polish the ends of the fibers which face each other in a convex shape; otherwise, a gap between the facing fiber ends would result in optical losses. The mirror-polished ends of the fibers are abutted against each other to constitute a so-called physical contact (PC) fiber connector. A PC fiber connector, therefore, suffers from a minimum of optical loss.

A device for mirror-finishing the ends of the fibers constituting a PC connector is disclosed in, for example, Japanese Patent Laid-Open Publication No. 63-102863 or Japanese Patent Publication No. 4-2388. It has been customary with such a mirror-finishing device to grind the end of a workpiece with a grindstone in rotation or lap it with free abrasive particles to provide it with a spherical shape, and then polish the spherical end by pressing it against a plastic sheet on which fine abrasive particles are present. As a result, the workpiece is provided with a smooth convex tip due to the local deformation of the plastic sheet and the effect of the fine abrasive particles. This kind of polishing operation is often performed in several consecutive steps while sequentially reducing the diameter of the abrasive particles. This provides the end of the work piece with a desired convex shape while reducing the surface roughness of the tip.

However, the conventional procedure described above has some problems left unsolved, as follows. To begin with, a number of steps and, therefore, a long processing time is necessary to provide the workpiece with a convex tip. Particularly, in the polishing step, as distinguished from the preceding grinding step, the grinding ability of the plastic sheet and fine abrasive particles cannot be maintained constant unless they are replaced frequently, resulting in low productivity. Moreover, since the procedure relies on the deformation of the plastic sheet, it is difficult to give the workpiece a convex tip having a precisely circular or oval cross-section.

SUMMARY OF THE INVENTION

It is, therefore, an object of the present invention to provide a device capable of mirror-polishing the end of a cylindrical workpiece with high precision.

It is another object of the present invention to provide a device capable of mirror-polishing the ends of various kinds of optical workpieces with high precision.

It is another object of the present invention to provide a device capable of mirror-polishing the end of an optical fiber connector or similar cylindrical optical workpiece in a convex shape efficiently, accurately, and rapidly.

In accordance with the present invention, a device for mirror-polishing the end of at least one elongate workpiece comprises a first disk-like rotatable grindstone having a work surface for polishing the end of the workpiece, the work surface having an arcuate concavity, a second disk-like rotatable grindstone having a work surface for correcting the arcuate concavity when the arcuate concavity is deformed, the first and second grindstones being positioned such that a direction in which the work surface of the first grindstone and the axis of rotation of the second grindstone are inclined a predetermined angle relative to each other, a first moving mechanism for moving the workpiece and the first grindstone relative to each other in order to bring the end of the workpiece and the work surface of the first grindstone into contact, and a second moving mechanism for moving the first and second grindstones relative to each other in order to bring the work surfaces thereof into contact.

Also, in accordance with the present invention, a method of mirror-polishing an elongate workpiece comprises the steps of forming an arcuate concavity in a work surface provided on the circumference of a disk-like grindstone, causing the grindstone to rotate, causing the workpiece to revolve, and bringing the end of the workpiece into contact with the work surface of the grindstone, wherein the end of the workpiece is provided with a convex shape by the arcuate concavity of the grindstone.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
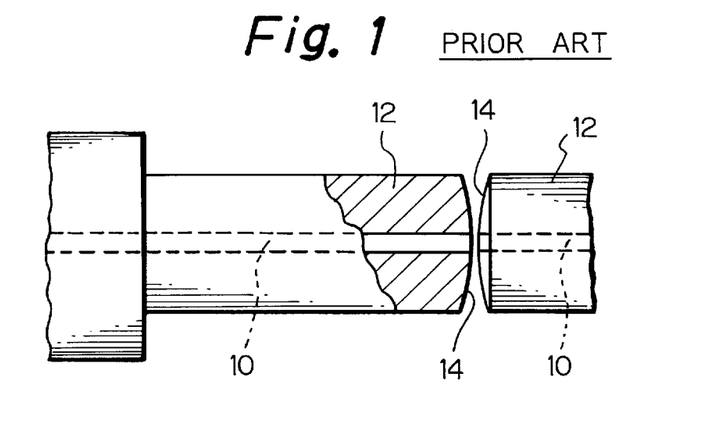
FIG. 1 a view showing an optical fiber connector to which the present invention is applicable.

To better understand the present invention, a brief reference will be made to a conventional mirror-polishing device. To begin with, FIG. 1 shows a PC connector stated previously. As shown, the PC connector has single mode optical fibers 10 each being formed of quartz and received in a glass ferrule 12. Each fiber 10 is provided with a convex hemispherical tip by mirror-polishing.

Figure 2A:
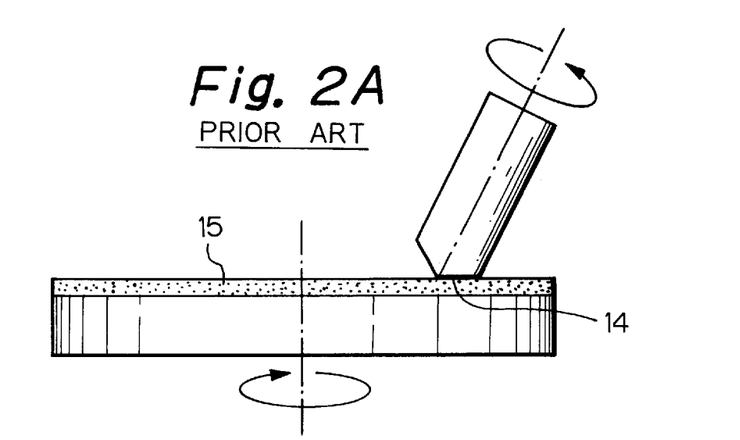
FIGS. 2A and 2B are views representative of a conventional procedure for mirror-polishing the end of a cylindrical workpiece.
Figure 2B:
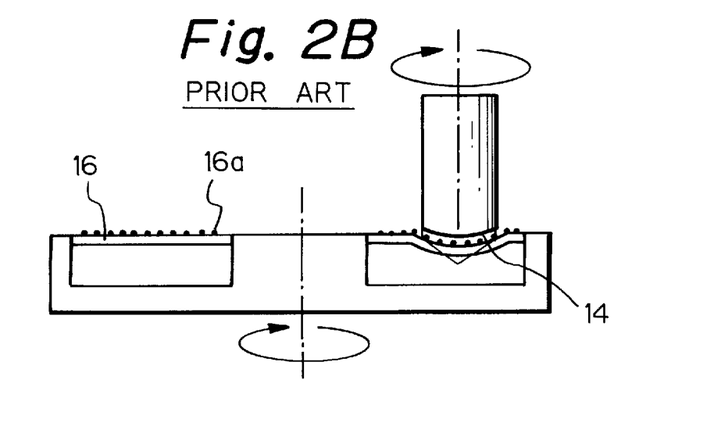

FIGS. 2A and 2B show a mirror-polishing device for providing the fibers 10 with convex tips and which is disclosed in the previously mentioned Japanese Patent Laid-Open Publication No. 63-102863 or Japanese Patent Publication No. 4-2388. As shown, a grindstone, or grinder, 15 is rotated to grind the end 14 of a workpiece, i.e., connector, thereby forming a conical tip. Then, the conical tip 14 is pressed against a plastic sheet, or polisher, 16 which is affixed to a turntable and provided with fine abrasive particles 16a thereon. As a result, the conical tip 14 is polished to turn out a smooth convex tip due to the local deformation of the sheet 16 and the effect of the abrasive 16a. Usually, such a polishing operation is performed in several consecutive stages while sequentially reducing the diameter of the fine abrasive particles 16a. This is successful in providing the connector with a convex tip while reducing the surface roughness thereof.

However, the problem with the conventional device is that a great number of steps are necessary for the end 14 of the connector to be fully polished into a convex shape. Particularly, the grinding ability of the sheet 16 and abrasive 16a cannot be maintained adequate at all times unless they are replaced frequently.

Figure 3:
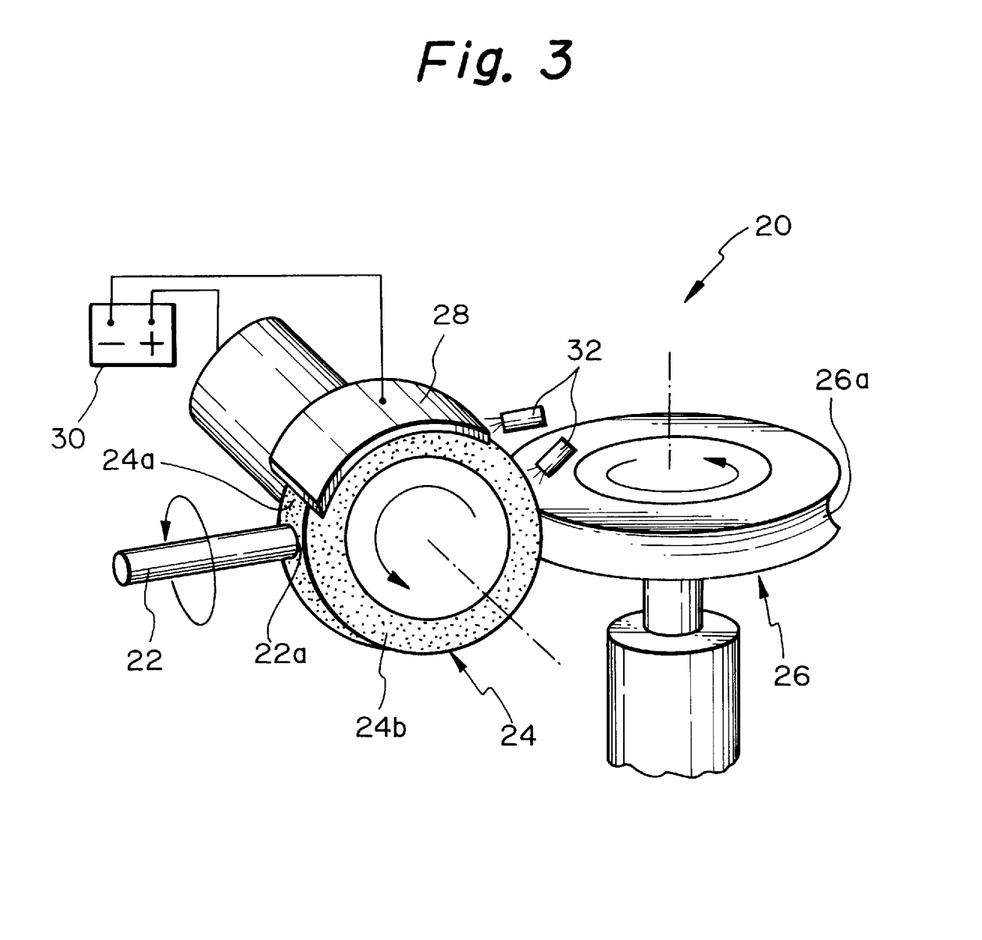
FIG. 3 is a fragmentary perspective view of a mirror-polishing device embodying the present invention.
Figure 4:
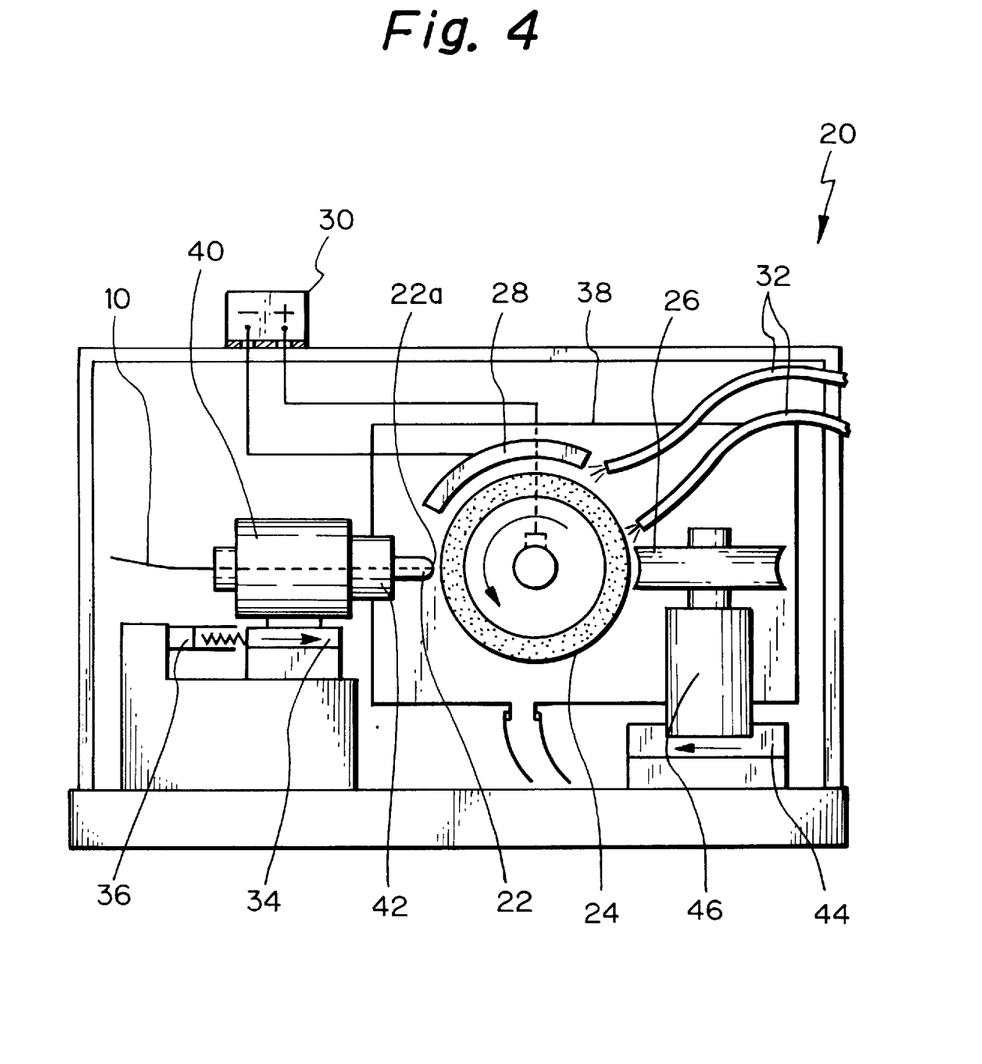
FIG. 4 is a side elevation showing the general construction of the embodiment.

Referring to FIGS. 3 and 4, a mirror-polishing device embodying the present invention is shown and generally designated by the reference numeral 20. As shown, the device 20 has a disk-like grindstone 24 for polishing an optical fiber or similar cylindrical workpiece 22, and a disk-like grindstone 26 for correcting the shape of the grindstone 24. The grindstone, or grinding wheel, 24 has a work surface 24a on the circumference thereof which processes the end 22a of the workpiece 22. The other grindstone, or correcting wheel, 26 has a work surface 26a on the circumference thereof which provides the work surface 24a of the grinding wheel 24 with a concavity having an arcuate cross-section. A negative electrode 28 extends along a part of the work surface 24a of the grinding wheel 24 and has an arcuate configuration, as illustrated. A DC power source 30 applies a voltage to between the electrode 28 and the grinding wheel 24. This voltage, in cooperation with a weakly conductive grinding fluid 32 fed to the work surface 24a of the wheel 24, causes an electrolytic dressing to act on the wheel 24. The electrolytic dressing is successful in maintaining an adequate grinding ability of the work surface 24a and in increasing the life of the wheel 24 to thereby obviate a need for a frequent replacement of the wheel 24. The workpiece 22 and stones 24 and 26 each rotated in a particular direction, as indicated by an arrow in the figures.

Specifically, the work surface 24a of the grinding wheel 24 is formed with an arcuate concavity by the correcting wheel 26. Hence, the grinding wheel 24 can be repeatedly used until the grindstone portion 24b thereof (marked with dots in FIG. 3) wears out. This eliminates the need for the frequent replacement of the abrasive 16a and plastic sheet 16 of the conventional device, FIGS. 2A and 2B, and, therefore, allows a greater number of workpieces to be processed continuously. The axes of rotation of the two wheels 24 and 26 are perpendicular to each other, so that the work surfaces 24a and 26a move in perpendicular directions relative to each other. In this configuration, when the correcting wheel 26 is brought into contact with the grinding wheel 24, the work surface 26a of the former provides the work surface 24a of the latter with a concavity having an arcuate cross-section. It is to be noted that the radius of curvature of the concavity of the work surface 24a is variable by changing the radius of the correcting wheel 26.

In operation, after the work surface 24a of the grinding wheel 24 has been provided with an arcuate concavity by the correcting wheel 26, the work surface 24a and the workpiece 22 are brought into contact with the radial direction of the concavity and the revolution axis of the workpiece 22 aligned with each other. As a result, so long as the grinding ability of the work surface 24a is maintained adequate, a convex tip 22a is formed at the end of the workpiece 22 with a radius of curvature equal to the radius of curvature of the concavity of the work surface 24a, i.e., the radius of the correcting wheel 26. As the grinding wheel 24 is repetitively operated to so process the ends of workpieces, the work surface 24a sequentially deforms and finally fails to configure the convex tip 22a accurately. Then, the correcting wheel 26 is again brought into contact with the grinding wheel 24 so as to correct the deformed concavity of the work surface 24a.

In the illustrative embodiment, the grinding wheel 24 and the correcting wheel 26 are respectively constituted by a metal-bonded material and a resin-bonded material which has a low bonding degree. Such materials maintain the processing ability of the work surface 24a adequate and increase the lives of the tools to thereby reduce the frequency of replacement of the wheel 24. A voltage is applied from the DC power source 30 to form a potential between the work surface 24a of the grinding wheel 24 and the negative electrode 28. This, coupled with the weakly conductive grinding fluid fed to the work surface 24a, exerts an electrolytic dressing on the wheel 24. The electrolytic dressing is effected when the end 22a of the workpiece 22 should be processed, but not when the concave work surface 24a should be corrected. This is because an excessive electrolytic dressing would cause the bonding of the wheel 24 to melt and disappear rapidly and would, therefore, deform the concave work surface 24a while aggravating the wear of the wheel 24. The device 20 sequentially polishes workpieces 22 by repeating such a cycle. The resulting convex tip of each workpiece 22 is precisely convex and has a minimum of surface roughness.

As shown in FIG. 4, the illustrative embodiment further includes a feeding mechanism 34 for causing the end 22a of the workpiece 22 to contact the work surface 24a by feeding the workpiece 22 at a constant rate, and a pressing mechanism 36 for urging the workpiece 22 against the work surface 24a under a constant pressure. There are also shown in FIG. 4 a cover enclosing the processing section of the device 20, a reversible motor 40, a chuck 42, a stage 44, and a motor 46.

Since each of the grinding wheel 24 and workpiece 22 shakes or vibrates throughout the processing operation, the convex tip 22a of the workpiece 22 is apt to suffer from strains and undulations. The embodiment is capable of suppressing such strains and undulations of the workpiece tip 22a. Briefly, the device 20 transfers the arcuate concavity of the grinding wheel work surface 24a to the workpiece end 22a, thereby providing the end 22a with a convex shape. Specifically, it is a common practice with this kind of processing device to polish the workpiece 22 while feeding it at a constant rate in the radial direction of the grinding wheel 24. In this condition, should the wheel 24 and workpiece 22 shake or vibrate, the workpiece 22 would be processed intermittently and, therefore, suffer from strains and undulations at the tip thereof. In the inventive embodiment, at the beginning, the feeding mechanism 34 feeds the workpiece 22 at a predetermined rate to roughly process the end 22a thereof, and then the pressing mechanism 36 presses the workpiece 22 against the grinding wheel work surface 24a under a predetermined pressure to finish the end 22a into a convex shape. Hence, shaking and vibrations are absorbed under the pressed condition with the result that the workpiece end 22a is surely provided with a smooth convex shape.

An example of the illustrative embodiment will be described together with specific processing conditions. In the example, the grinding wheel 24 was implemented by bronze-bonded 4,000 mesh diamond grains and was provided with an outside diameter of 75 mm and a thickness of 5 mm. The correcting wheel 26 was implemented by resin-bonded mesh 3,000 diamond grains and was provided with an outside diameter of 40 mm and a thickness of 5 mm. The optical fiber connector having the single mode fiber 10 received in the glass ferrule 12, as shown in FIG. 1, was used as a cylindrical workpiece.

The grinding wheel 24 was caused to spin at a speed of 2,000 rpm. While the motor 46 for driving the correcting wheel 26 was rotated at a speed of 100 rpm, the stage 44 carrying the wheel 46 thereon was moved toward the grinding wheel 24, as indicated by an arrow in FIG. 4. As a result, the correcting wheel 26 was brought into contact with the grinding wheel 24 with the grinding fluid 32 being supplied. In this condition, the correcting wheel 26 provided the work surface 24a of the wheel 24 with an arcuate concavity having a radius of curvature which was 20 mm. The concavity of the work surface 24a was not susceptible to the bonding material or the abrasive of the wheel 26 and had a radius of curvature equal to the radius of the wheel 26.

While the grinding fluid 32 was continuously fed a space to between the negative electrode 28 and the grinding wheel 24, a DC voltage was applied from the power source 30 across a gap between the electrode 28 and the grinding wheel 24 in order to effect an electrolytic dressing. Specifically, just before processing the end 22a of the workpiece the electrolytic dressing was applied for 15 seconds by an electrolytic current of 2 Amps. As a result, abrasive particles distributed on the work surface 24a were caused to project away therefrom, thereby enhancing the grinding ability of the surface 24a.

The feeding mechanism 34, which used a pulse stage, moved the workpiece 22 toward the grinding wheel 24 at a constant rate while causing it to revolve about the axis thereof. After the workpiece 22 had contacted the wheel 24, it was roughly processed by the wheel 24. Subsequently, the workpiece 22 was held in contact with the wheel 24 for 5 seconds while being pressed by the pressing mechanism 36 under a constant load of 500 grams. The pressing mechanism 36 was implemented by an air cylinder. The constant load was successful in causing the protruding abrasive particles to come off the work surface 24a and, therefore, in obviating scratches which would otherwise occur on the workpiece end 22a. Specifically, the reversible motor 40 caused the workpiece 22 to revolve at a speed of 50 rpm while reversing the rotation every one and half rotations. Thereafter, while the pressing mechanism 36 exerted a lower load of 100 grams on the workpiece 22, the workpiece 22 was continuously held in contact for 10 seconds to have the end 22a thereof finished.

The resulting convex tip 22a of the workpiece 22 was found to have a smooth convex shape with a radius of curvature equal to the radius of curvature of the concavity of the polishing wheel 24, i.e., 20 mm and with a surface roughness which was less than 0.08 $\mu$m Rmax. While the example used an optical fiber connector made of glass, a desirable convex tip was also achieved with a connector whose ferrule 12, FIG. 1, was implemented by zirconia ceramics.

When the end 22a of the workpiece 22 was processed without an electrolytic dressing, the grinding ability of the work surface 24a was not maintained adequate with the result that the tip 22a had an aventurine surface with a roughness which was greater than 0.2 $\mu$m Rmax. Further, when the workpiece 22 was simply fed into contact with the work surface 24a under an electrolytic dressing, the end 22a thereof was polished intermittently due to the shaking of the wheel 24 as well as to other factors. As a result, the workpiece tip 22a suffered from strains and undulations.

When the concave work surface 24a of the grinding wheel 24 was deformed due to repeated processing, the electrolytic dressing was suspended, and then the stage 44 was moved to bring the correcting wheel 26 into contact with the grinding wheel 24. Every time correction is effected by the wheel 26, the outside diameter of the grinding wheel 24 decreased by 3 $\mu$m. However, when the wheel 24 polished the workpiece end 22a without any electrolytic dressing, excessive resistance acted on the work surface 24a and critically deformed the concavity of the work surface 24a. Further, when the concavity of the work surface 24a was corrected under an electrolytic dressing, the metal-bonded material of the grinding wheel 24 was removed in an excessive amount; the outside diameter of the wheel 24 decreased by 5 $\mu$m to 8 $\mu$m each time.

After the correction of the concave work surface 24a of the grinding wheel 24, the tip 22a of another workpiece 22 was processed in the same manner as the tip 22a of the first workpiece 22. Such a processing cycle was repeated until the grindstone 24b of the grinding wheel 24 wore out. As a result, a highly reproducible convex tip whose radius of curvature and surface roughness was 20 mm and 0.08 $\mu$m Rmax, respectively, was achieved with 1,000 workpieces.

It was found that the embodiment reduced the polishing time per workpiece to less than one-half of the conventional polishing time. In addition, the time loss ascribable to the replacement of tools was reduced to less than 1/50.

Figure 5:
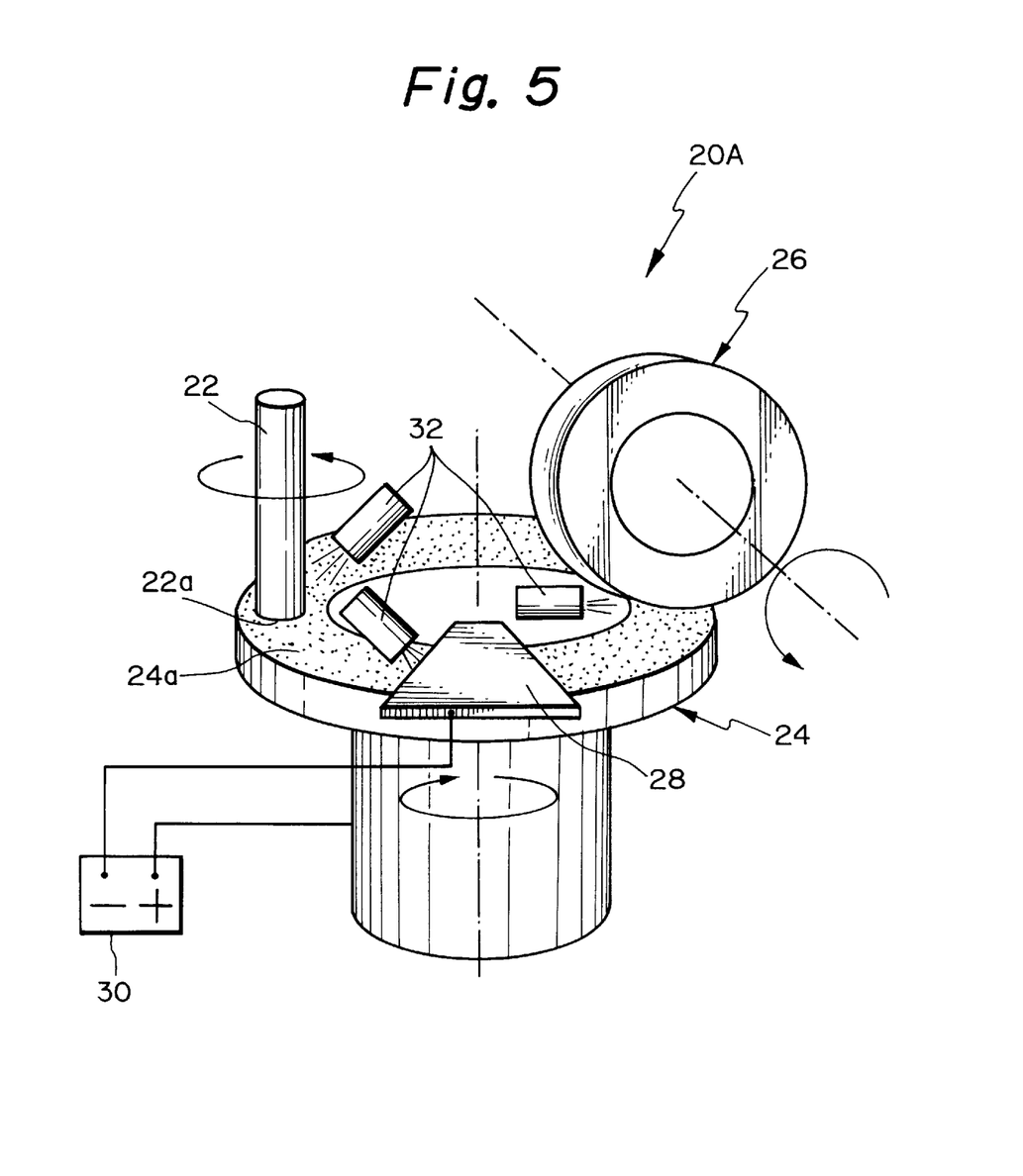
FIGS. 5 and 6 are fragmentary perspective views of a modification of the embodiment.

Referring to FIG. 5, a modification of the embodiment described above is shown. As shown, a mirror-polishing device, generally 20A, differs from the device 20 in that the grinding wheel 24 has the work surface 24a on one of opposite axial ends thereof. Therefore, the correcting wheel 26 for correcting the concavity of the work surface 24a is held in the illustrated position relative to the grinding wheel 24.

Figure 6:
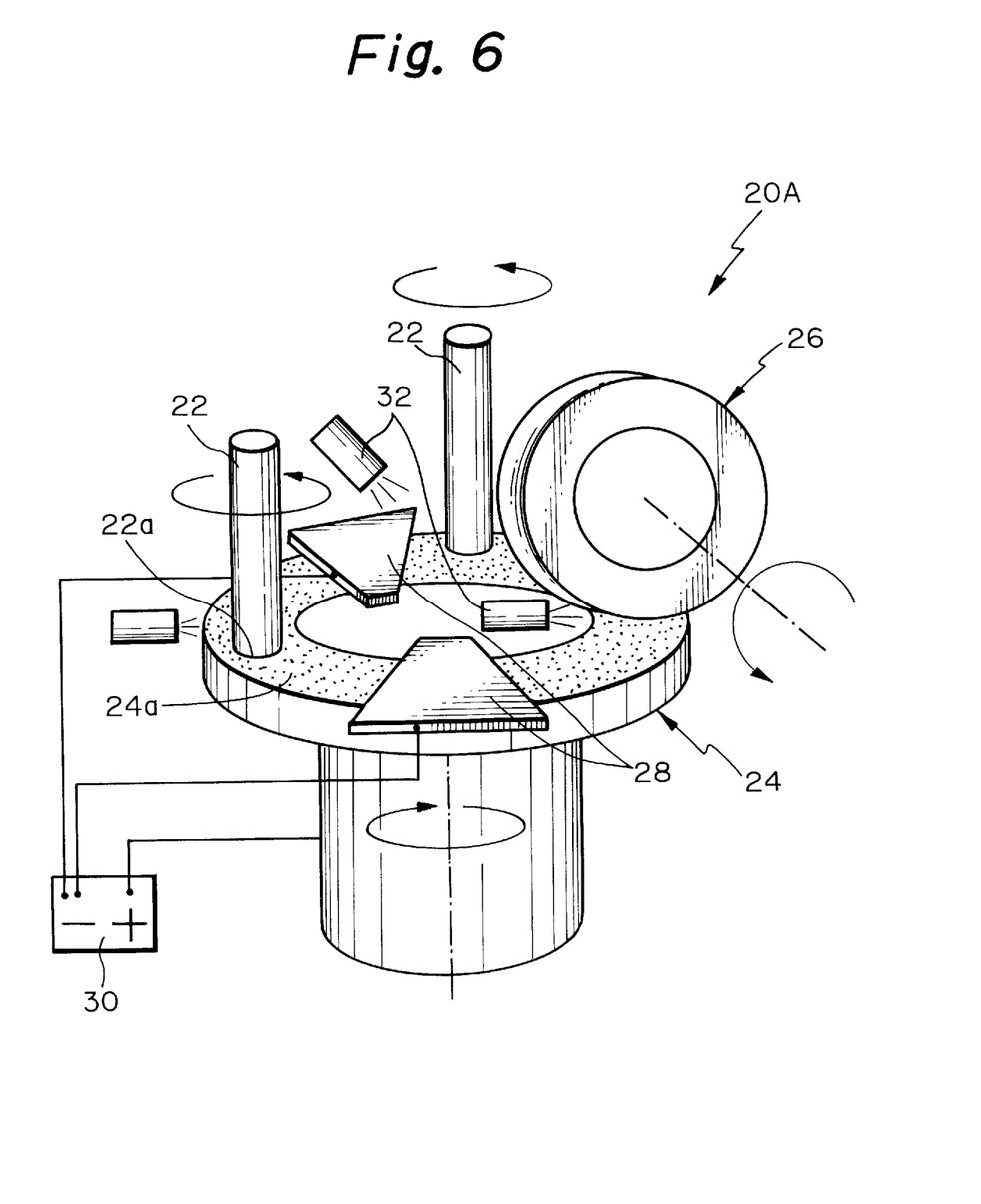

As shown in FIG. 6, the device 20A is capable of processing the ends 22a of a plurality of workpieces 22 at the same time. When the device 20A handles a plurality of workpieces 22 at the same time, the effect of the electrolytic dressing acting on the grinding wheel 24 is apt to diminish just after polishing, causing the work surface 24a to become clogged or stuffed up. To eliminate this problem, in the illustrative embodiment, a plurality of negative electrodes 28, equal to or smaller in number than the workpieces 22, are used and arranged alternately with the workpieces 22 in a well balanced condition. In this configuration, an electrolytic dressing is effected anew just before the grinding wheel 24 processes the next workpiece 22, so that the wheel 24 can maintain the grinding ability stable at all times.

The work surfaces 24a and 26a of the wheels 24 and 26, respectively, run perpendicularly to each other when the latter is brought into contact with the former. After the grinding wheel 24 has been formed with concavity by the correcting wheel 26, each workpiece 22 is fed into contact with the wheel 24 in a perpendicular position and such that the center of curvature of the concavity of the stone 24 and the revolution axis of the workpiece 22 are concentric with the axis of rotation of the wheel 24. As a result, the workpiece 22 is provided with a hemispherical convex tip 22a.

Figure 7:
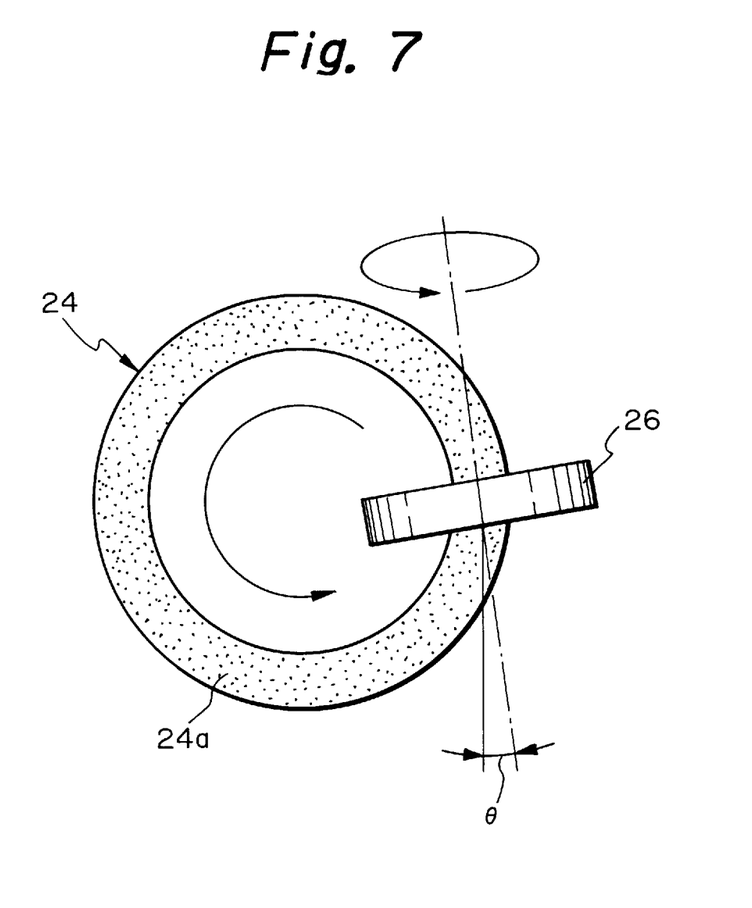
FIG. 7 is a plan view showing an alternative positional relation between two grindstones included in the modification.

FIG. 7 shows another specific positional relationship between the two wheels 24 and 26 included in the modified embodiment. As shown, the work surfaces of the stones 24 and 26 are inclined by an angle θ of 10 degrees relative to each other. Specifically, the direction in which the wheel work surface 24a runs and the axis of rotation of the wheel 26 are inclined by an angle θ ranging from zero degree to 45 degrees. Such a relative position provides the work surface 24a with a concavity having an oval cross-section which has an eccentricity corresponding to the angle θ. When the workpiece 22 is brought into contact with such a work surface 24a, it is provided with a convex tip 22a having an oval cross-section. A plurality of workpieces 22 may be caused to contact the work surface 24a at the same time, if desired.

Figure 8:
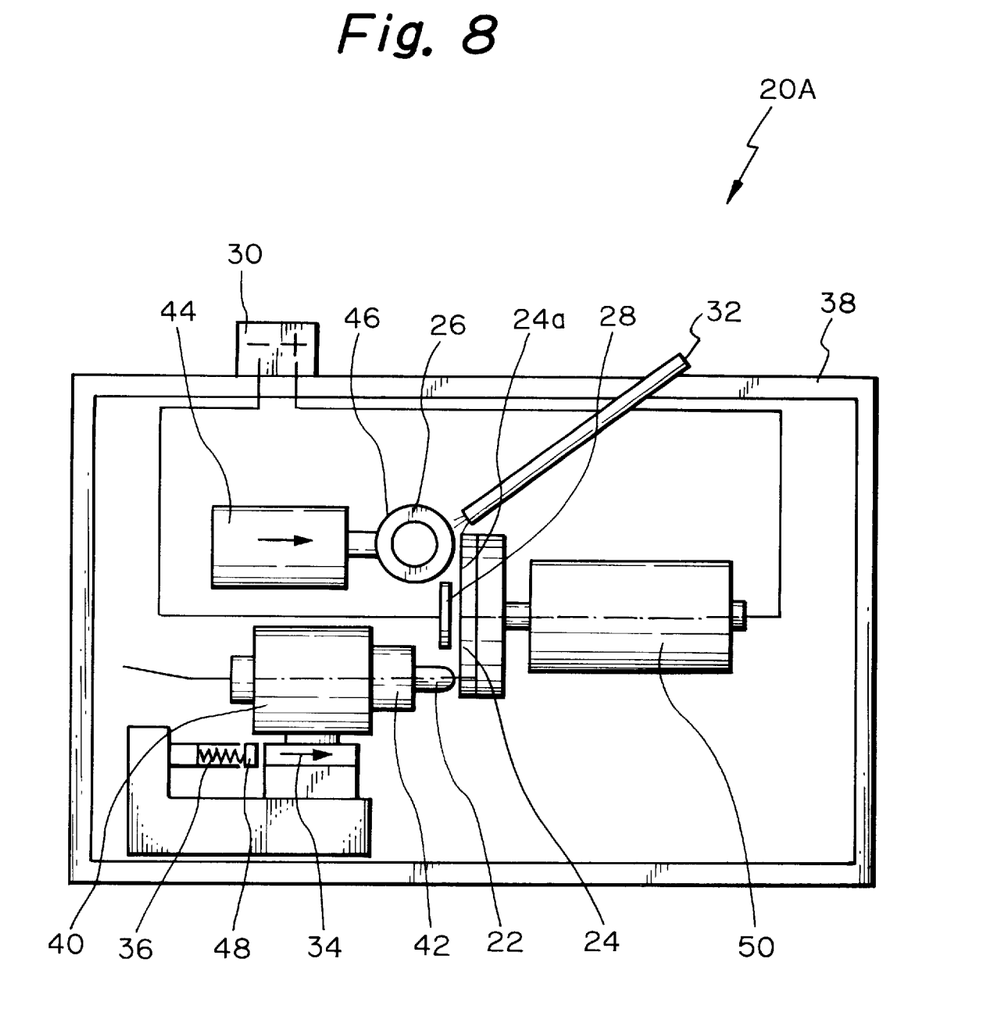
FIG. 8 is a side elevation showing the general construction of the modification.

As shown in FIG. 8, the polishing device 20A has a vibration attenuating member 48 between the pressing mechanism 36 and the workpiece 22, in addition to the constituent parts of the polishing device 20 shown in FIG. 4. The vibration attenuating member 48 attenuates the shaking and vibrations of the grinding wheel 24 and workpiece 22. The shaking and vibrations would cause the workpiece 22 to be processed intermittently, resulting in a convex tip 22a strains and undulations, as discussed earlier. In FIG. 8, the reference numeral 50 designates a motor for driving the grinding wheel 24.

An example of the modified embodiment will be described together with specific processing conditions thereof, with reference to FIGS. 5 and 8. FIG. 8 shows a condition wherein the polishing device 20 polishes a single workpiece 22. The grinding wheel 24 was constituted by bronze-bonded mesh 4,000 diamond abrasives. The grinding wheel 24 had a cup type configuration whose outside diameter was 100 mm. The correcting wheel 26 was constituted by resin-bonded mesh 3,000 diamond abrasives and had an outside diameter of 40 mm and a thickness of 5 mm. As shown in FIG. 1, the workpiece 22 was implemented as the optical fiber connector, FIG. 1, having the single mode quartz fiber 10 inserted in the ferrule 12.

In operation, the motor 50 for driving the grinding wheel 24 was rotated at a speed of 1,800 rpm while the motor 46 for driving the correcting wheel 26 was rotated at a speed of 100 rpm. As shown in FIG. 5, while the work surfaces 24a and 26b of the wheels 24 and 26, respectively, were held perpendicular to each other, the stage 44 carrying the correcting wheel 26 was moved until the wheel 26 contacted the grinding wheel 24. While the grinding fluid 32 was continuously fed, the wheel 26 formed in the work surface 24a of the wheel 26 an arcuate concavity having an truly circular cross-section whose radius of curvature was 20 mm. The radius of curvature of the concavity is equal to the radius of the correcting wheel 26 without regard to the kinds of the bonding material and abrasives of the grinding wheel 24 or those of the correcting wheel 26.

Subsequently, a DC voltage was applied from the power source 30 across the gap between the negative electrode 28 and the wheel 24 with the grinding fluid 32 being fed to the space between them. In the illustrative embodiment, just before the workpiece end 22a was processed, an electrolytic dressing was effected for 15 seconds by an electrolytic current of 2 Amps in order to cause the abrasive particles on the work surface 24a to protrude. Such an electrolytic dressing provided the work surface 24a with a desirable processing condition.

As shown in FIG. 8, the workpiece 22 was fed toward the work surface 24a by the feeding mechanism 34 at a constant rate while being caused to revolve by the reversible motor 40. On contacting the work surface 24a, the workpiece 22 was roughly ground. Thereafter, the workpiece 22 was urged against the work surface 24a for 5 seconds under a constant load of 500 grams as exerted by the pressing mechanism 36. The constant load causes the abrasive particles protruding from the work surface 24a to come off, thereby leveling the work surface 24a. This is successful in freeing the workpiece end 22a from scratches. The reversible motor 40 was driven at a speed of 50 rpm and was reversed every one and half rotations. Finally, the workpiece 22 was held in contact with the work surface 24a for 10 seconds under a light constant load of 100 grams as also exerted by the pressing mechanism 36.

As a result, the workpiece end 22a was finished. As the polishing operation was repeated, the work surface 24a of the wheel 24 was deformed. Then, the stage 44 was again moved toward the wheel 24 to cause the wheel 26 to correct the concavity of the work surface 24a. The convex tip 22a of the workpiece 22 had a radius of curvature equal to the radius of curvature of the concavity of the work surface 24a, i.e., 20 mm and a surface roughness of less than 0.08 μm Rmax; that is, the tip 22a had a smooth truly circular cross-section.

The advantage described above was also achieved when the cylindrical glass ferrule 12, FIG. 1, was replaced with a zirconica ceramics ferrule or a plastics ferrule or even with a workpiece having a rectangular cross-section. Further, in the configuration of FIG. 7 wherein the work surfaces 24a and 26a, i.e., the running direction of the work surface 24a and the axis of rotation of the wheels 26 are inclined 10 degrees relative to each other, the wheel 26 formed a concavity having an oval cross-section in the work surface 24a. When the workpiece 22a was polished by such the work surface 24a having such an oval concavity, it was provided with a convex tip 22 having an oval cross-section. When the above-mentioned angle was sequentially increased, the eccentricity of the oval cross-section sequentially increased.

This embodiment, like the previous embodiment, reduced the processing time to less than one-half of the conventional processing time. Further, when a plurality of workpieces 22 was polished by the work surface 24a at the same time, the processing time per workpiece was further reduced, as compared to the case wherein a single workpiece 22 was processed alone. In addition, the time loss due to the replacement of tools was reduced to less than 1/50, as compared to the conventional method using the plastic sheet 16 and fine abrasive particles 16a.

In summary, it will be seen that the present invention provides a mirror-polishing device capable of processing the end of an optical fiber connector or that of any other workpiece made of, for example, glass, ceramics plastics or a combination thereof in a far shorter period of time than conventional and in an accurate convex configuration. In addition, the device of the present invention noticeably reduces the frequency of replacement of tools thereof, thereby increasing productivity to a significant degree.

Various modifications will become possible for those skilled in the art after receiving the teachings of the present disclosure without departing from the scope thereof.

What is claimed is:

1. A device for mirror-polishing an end of at least one elongated work piece, said device comprising:

means for supporting and moving a work piece, vibration attenuating means intervening between said moving means and the workpiece, a first grindstone having a disk shape with two spaced parallel flat faces and with a first circular periphery, said first grindstone being mounted to rotate about a first axis, a first work surface area on said first grindstone, said first work surface area having a cross section containing an arcuate concavity for polishing said end of said work piece into a convex shape, a second grindstone having a disk shape with two spaced parallel faces and with a second circular periphery, said second grindstone being mounted to rotate about a second axis, said two spaced parallel faces of said second circular periphery having an arcuate sector which is complementary to the cross section of said arcuate concavity when said first and second grindstones are in contact with each other, the first axis and the second axis being perpendicular to each other.

said first and second grindstones comprising a metal-bonded material and a resin-bonded material, respectively, whereby when said first and second grindstones are rotating in contact with each other and with said first and second axes at said perpendicular angle, said arcuate sector correcting the arcuate concavity of the first grindstone as it wears responsive to a working of the polished end of the work piece into said convex shape;

feeding means for causing the workpiece to make contact with said work surface of said first grindstone by feeding said workpiece at a constant rate, pressing means for causing said workpiece to remain in contact and under a constant pressure with said work surface of said first grindstone, and electrolytic dressing means for applying electrolytic dressing to said work surface of said first grindstone, said electrolytic dressing means comprising a negative electrode adjoining said work surface of said first grindstone, wherein a DC voltage is applied to between said negative electrode and said first grindstone when a polishing liquid is applied to said work surface of said first grindstone.

2. A device as claimed in claim 1, wherein said work surface of said first grindstone is provided on one of said flat faces of said first grindstone, and said complementary sector of said second grindstone is on said circular periphery of said second grindstone.

3. A device as claimed in claim 2, wherein the workpiece and said first grindstone are positioned such that a center of curvature of said arcuate concavity of said first grindstone and a revolution axis of said workpiece are parallel with an axis of rotation of said first grindstone.

4. A device as claimed in claim 2, wherein a plurality of workpieces face said work surface of said first grindstone such that a center of curvature of said arcuate concavity of said first grindstone and axes of rotation of said plurality of workpieces are parallel with an axis of rotation of said first grindstone, wherein ends of said plurality of workpieces contact said work surface of said first grindstone at the same time.

5. A device as claimed in claim 4, wherein said electrolytic dressing means comprises a plurality of negative electrodes, the workpieces and the electrodes being identical in number, one of the negative electrodes being located next to the second grindstone and offset therefrom in the direction in which the work surface of the first grindstone runs, the locations of the workpieces alternating with the locations of the electrodes with said work pieces and electrodes being separated by substantially equal intervals, wherein a DC voltage is applied to between said first grindstone and each of said plurality of negative electrodes when a polishing liquid is applied between said workpiece of said first grindstone and the negative electrodes.

* * * * *